(No Model.) 3 Sheets—Sheet 1.
C. T. PARRY.
MANUFACTURE OF LOCOMOTIVE FRAMES.
No. 255,329. Patented Mar. 21, 1882.
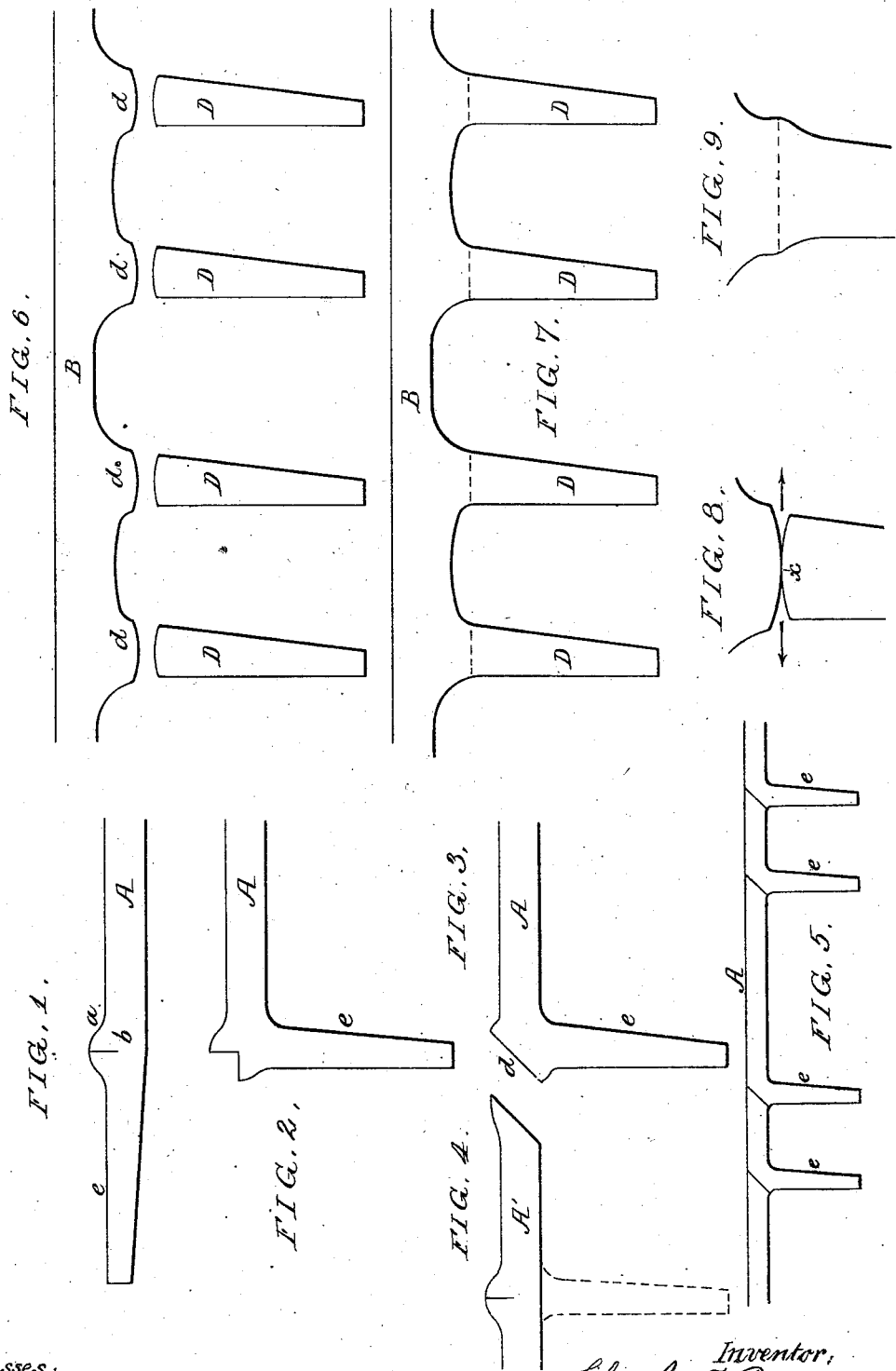
Witnesses:
Harry Drury
Harry Smith
Inventor:
Charles T. Parry
by his attorneys
Howson and Sons

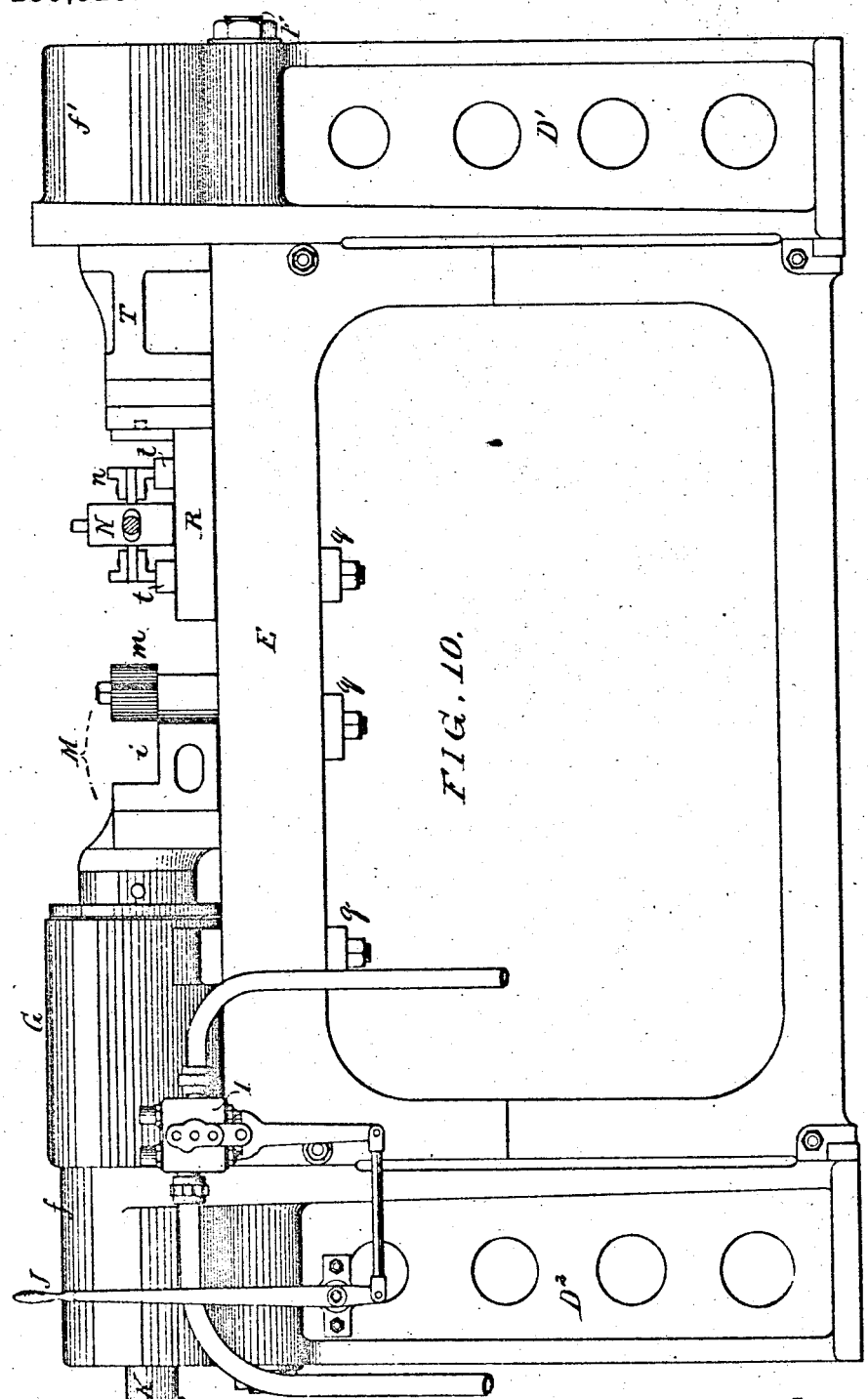

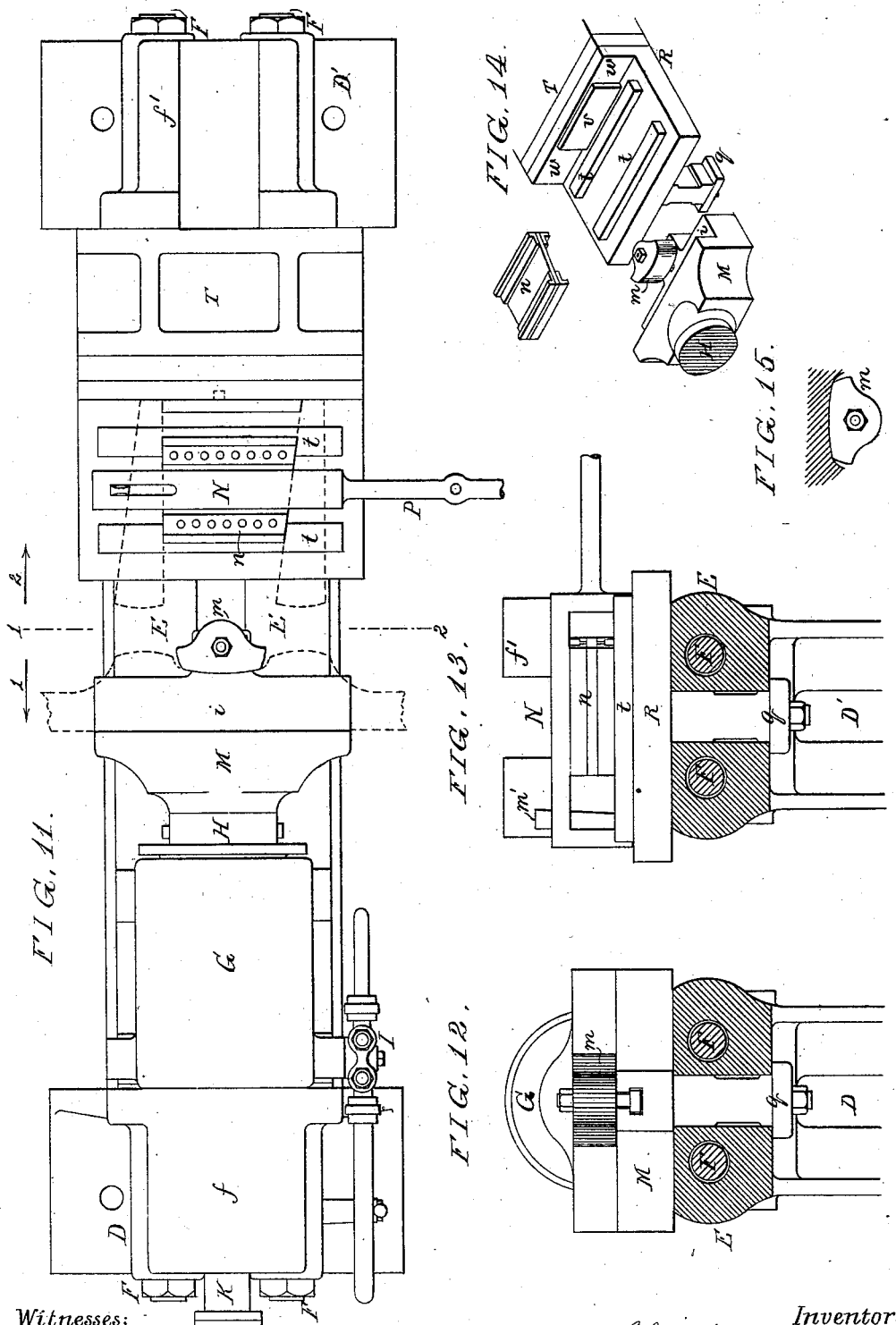

UNITED STATES PATENT OFFICE.

CHARLES T. PARRY, OF PHILADELPHIA, PENNSYLVANIA.

MANUFACTURE OF LOCOMOTIVE-FRAMES.

SPECIFICATION forming part of Letters Patent No. 255,329, dated March 21, 1882.

Application filed November 21, 1881. (No model.)

*To all whom it may concern:*

Be it known that I, CHARLES T. PARRY, a citizen of the United States, residing in Philadelphia, Pennsylvania, have invented certain Improvements in the Manufacture of Frames for Locomotive-Engines and in Machinery therefor, of which the following is a specification.

My invention consists of an economical mode, described hereinafter, of making the wrought-iron frames of locomotive engines; also, of a machine, described hereinafter, for carrying this mode into effect.

In the accompanying drawings, Figures 1, 2, 3, 4, and 5, Sheet 1, are views illustrating one of the modes heretofore practiced of making the frames of locomotive-engines; Figs. 6, 7, 8, and 9, views showing my improved mode of making the frame; Fig. 10, Sheet 2, a side view of my improved machine for forging the frames; Fig. 11, Sheet 3, a top view of the machine; Fig. 12, a vertical section of part of the machine on the line 1 2, Fig. 11, looking in the direction of the arrow 1; Fig. 13, a vertical section on the same line, looking in the direction of the arrow 2; Fig. 14, perspective views, illustrating parts of the machine; and Fig. 15, an illustrative diagram, referred to hereinafter.

It will be well in the first place to describe one of the modes in common use of forging the frames of locomotive-engines prior to my invention. This is illustrated by Figs. 1, 2, 3, 4, and 5, Sheet 1, in which A, Fig. 1, is a wrought-iron bar of the desired depth and thickness, and having its portion $e$ made tapering. An enlargement, $a$, on the bar is notched at $b$, after which the bar, while hot, is bent to the shape shown in Fig. 2, and afterward flattened at $d$, Fig. 3, so as to be in a condition to be welded to another bar, the turned-down end $e$ forming one of the hangers or guides for the axle-box. The beveled end of another bar, A', Fig. 4, is then welded to the beveled portion $d$ of the bar A, and an enlargement of this second bar is notched and bent down, so as to form the second hanger or guide for the axle-box; and this is continued until a frame with the desired number of axle-box guides is made, the view Fig. 5 showing part of a frame, in which the points where the weldings occur are shown by inclined lines. Other forging operations are of course required to complete the frame; but as my invention does not extend to these subsequent operations a description of them will be unnecessary. Discarding these tedious operations, I have adopted the mode of making frames which can be best explained by reference to Figs. 6, 7, 8, and 9.

B, Fig. 6, represents a bar of the desired length, thickness, and depth demanded by the upper portion of the frame. Projections $d$ are forged on the under side of this bar at the points where the hangers or guides occur in the finished frame, and these projections are rounded, as shown. A number of tapering forgings D D are made, which eventually become the hangers or axle-box guides of the frame, and these also are rounded at the ends, which have to be welded to the projections $d$.

For welding the forgings to the bar I prefer to use a machine which I will explain hereinafter. It will suffice to remark here that while the bar B is held, and while two of its projections $d$ are at a welding-heat, two of the forgings D D, held in a frame, and having their rounded ends also at a welding-heat, are forced toward the bar, and a welding of the forgings to the bar is effected, the superior character of the joints being due in a great measure to the rounding of the projections and forgings; for, as will be seen on reference to Fig. 8, the welding commences at the central point, $x$, and as the pressure against the forgings is continued, any scoria which may be on the heated metal will be forced outward in the direction of the arrows, Fig. 8. Thus a clean junction will be effected, the result of forcing the welding-hot forging against the welding-hot projections, or vice versa, being shown in Fig. 9. The work must of course be subsequently finished by hammering and otherwise.

I will now proceed to describe the mechanism by which I prefer to carry into effect this mode of forging locomotive-frames, reference being had to Sheets 2 and 3 of the drawings.

D' D² are two substantial frames or standards, secured to intermediate frames, E E, mainly by two longitudinal bolts, F F, which, as will be seen hereinafter, resist the pressure exerted to effect the above-described weldings. The upper end, $f$, of the standard D² forms the abutment for the cylinder G of a hydraulic ram, the said cylinder being secured to the intermediate frame, E, and the upper end, $f'$, of the standard D' forms the abutment for resisting the pressure imparted to the ram or piston H of the cylinder G, this ram terminating in a cross-head, M, referred to hereinafter.

It is not necessary to describe the construction of the hydraulic ram, as it may be similar to mechanism of this class which has been long used for imparting great pressure to objects. The hydraulic ram, moreover, is not essential to my invention, for suitable gearing with other appliances may be employed in place of the hydraulic cylinder and its ram. It will suffice to remark here that a valve-chest, I, communicates with the cylinder and with a supply of water under pressure, and that there are two valves which can be operated by a lever, J, for admitting water to the cylinder when the ram has to be forced outward and for discharging the water used for forcing out the ram into an outlet-pipe and admitting water under pressure to a smaller cylinder, K, when the ram has to be retracted.

The cross-head M of the ram is arranged to slide on the top of the intermediate frame, and is recessed at $i$ for receiving the locomotive-frame, which is shown by dotted lines in Fig. 11. To a projection on the cross-head is secured a block, $m$, the inner face and ends of which are made to accord, or nearly so, with the shaded portion of the frame in Fig. 15—that is, the portion between the two projections $d\ d$—the cross-head, with this block, being most clearly shown in Fig. 14.

Two of the forgings D D to be welded to the projections $d\ d$ of the locomotive-frame are secured to a yoke, N, as best observed in Figs. 10, 11, and 13, by a key, $m'$, a distance-piece, $n$, being arranged between the forgings. This yoke is attached to a bar, P, and the latter will in most cases be suspended from the jib of a crane, so that the yoke N and its contents can be swung round to the hearth, where the ends of the forgings D D can be reduced to a welding-heat, and from the hearth to the machine when the forgings have to be welded to the frame. A plate, R, rests on the top of the intermediate frame of the machine, and a projection, $q$, on the under side of this plate fits between the intermediate frames, to which the plate can be bolted after adjustment, as shown in Figs. 12 and 13, and between the rear of the plate and the abutment $f'$ are introduced suitable filling-pieces, T, Figs. 10 and 11.

There are two bars, $t\ t$—preferably loose bars—on the plate R, and on these bars rests the filling-piece $n$, so that the yoke itself is not in contact with the plate. The ends of the forgings D D bear against the flange $w$ of the plate R, one on each side of a projection, $v$, on the flange, the said projection determining the proper lateral adjustment of the yoke on the plate. When the bar B, with its projections $d\ d$ at a welding-heat, has been placed on a cross-head, and the yoke, with its forgings having ends welding-hot, has been adjusted to the plate R in the manner above described, the ram, with its cross-head, is moved forward, carrying with it the bar B and thrusting the welding-hot projections $d$ of the same against the welding-hot ends of the forgings, the metal closing on the ends of the block $m$, Fig. 15, which thus serves to impart the desired shape to the frame between the two forgings D D, which have now become the hangers or axle-box guides of the frame. After the welding has been completed the key $m'$ is loosened and the cross-head retracted, carrying with it the frame, owing to the block $m$. The yoke is now moved away from the machine to receive two new forgings, D D, which are reduced to a welding-heat, the frame being also withdrawn, so that two projections $d\ d$ other than those above referred to may be heated, after which a repetition of the above-described operations takes place.

I claim as my invention—

1. The mode herein described of making the wrought-iron frames of locomotives, the said mode consisting in, first, forging projections $d\ d$ on a bar, B, and preparing forgings D D; and, second, applying the bar to the forgings or the forgings to the bar under pressure while both are at a welding-heat at the points where the union has to be effected, all substantially as set forth.

2. The mode herein described of effecting a clean welding of the projections $d\ d$ of the bar to the forgings D D, the said mode consisting in rounding the said projections and forgings and heating them to a welding-heat and applying the rounded ends of the projections while at a welding-heat to the welding-hot rounded ends of the forgings or the forgings to the projections under direct pressure, all substantially as set forth.

3. The within-described holder for the forgings D D, the same consisting of the yoke N, distance-piece $n$, and key $m'$, all being combined, substantially as set forth.

4. The combination of the plate R, its flange $w$, and the abutment $f'$ of the frame with the recessed cross-head and its block $m$ and mechanism for operating either the plate or the cross-head, substantially as set forth.

In testimony whereof I have signed my name to this specification in the presence of two subscribing witnesses.

CHAS. T. PARRY.

Witnesses:
 HARRY DRURY,
 HARRY SMITH.